June 14, 1966     J. J. KUPCHICK     3,256,050

INTEGRAL RIVETED RETAINER

Filed Dec. 3, 1963     2 Sheets-Sheet 1

INVENTOR.
John J. Kupchick
BY
Frank G. Bruer
ATTORNEY

June 14, 1966    J. J. KUPCHICK    3,256,050
INTEGRAL RIVETED RETAINER

Filed Dec. 3, 1963    2 Sheets-Sheet 2

INVENTOR.
John J. Kupchick
BY
Frank C. Bower
ATTORNEY

United States Patent Office 3,256,050
Patented June 14, 1966

3,256,050
INTEGRAL RIVETED RETAINER
John J. Kupchick, Forestville, Conn., assignor, by mesne assignments, to TRW Inc., a corporation of Ohio
Filed Dec. 3, 1963, Ser. No. 327,600
3 Claims. (Cl. 308—201)

This invention relates to retainers for ball bearings and is directed particularly to fastening means for attaching the two parts of a retainer together.

An object of the invention is to provide a cage or retainer for bearing balls formed in two parts with fastening means that securely lock the two parts together in proper relation with the bearing balls.

Another object of the invention is to provide a fastening means for a two-part cage that securely and permanently locks the two parts together in proper bearing ball retaining relation in an inexpensive and easy manner.

Other and further objects and advantages will be apparent from the following description taken in connection with the drawings in which FIG. 1 is a fragmentary side view of a ball bearing;

Figure 1:
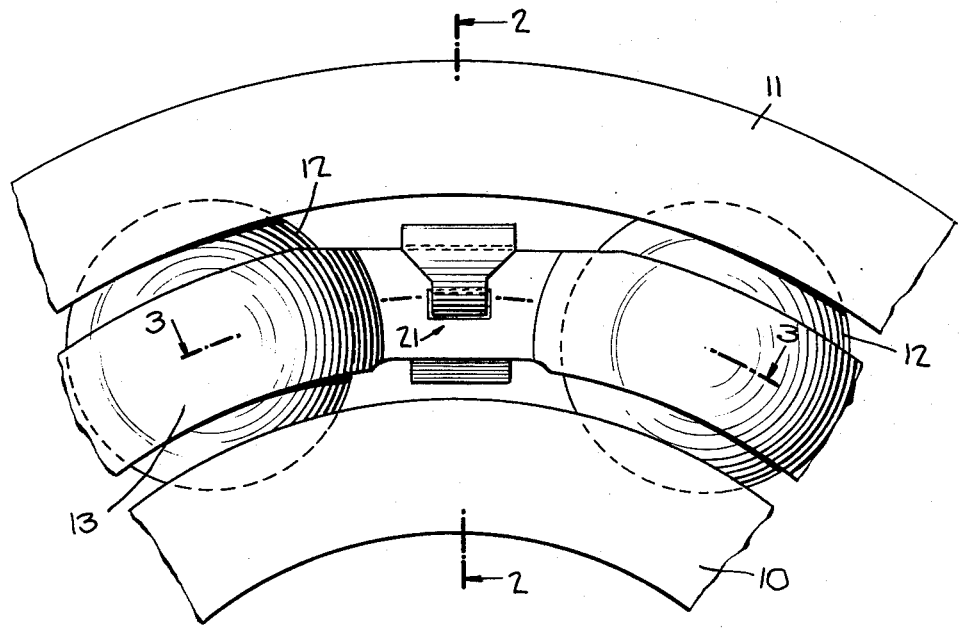

Referring to the drawings, the illustrated ball bearing has an inner ring 10 and an outer ring 11 with bearing balls 12 therebetween. The bearing balls are circumferentially spaced by cage 13 formed in two parts 14 and 15. The parts 14 and 15 extend circumferentially between the inner and outer rings and are matched to form a complete cage and hold the bearing balls in proper relation.

The parts 14 and 15 have semicircular portions 16 and 17, respectively, mating to form spaces 18 for receiving the bearing balls. Between the semicircular portions are webs 19 and 20. Webs 19 connect the semicircular portions 16 and the webs 20 connect the semicircular portions 17. The fastening means 21 are provided on the webs for firmly and rigidly securing the cage parts into a unitary bearing ball retainer or cage.

Figure 2:
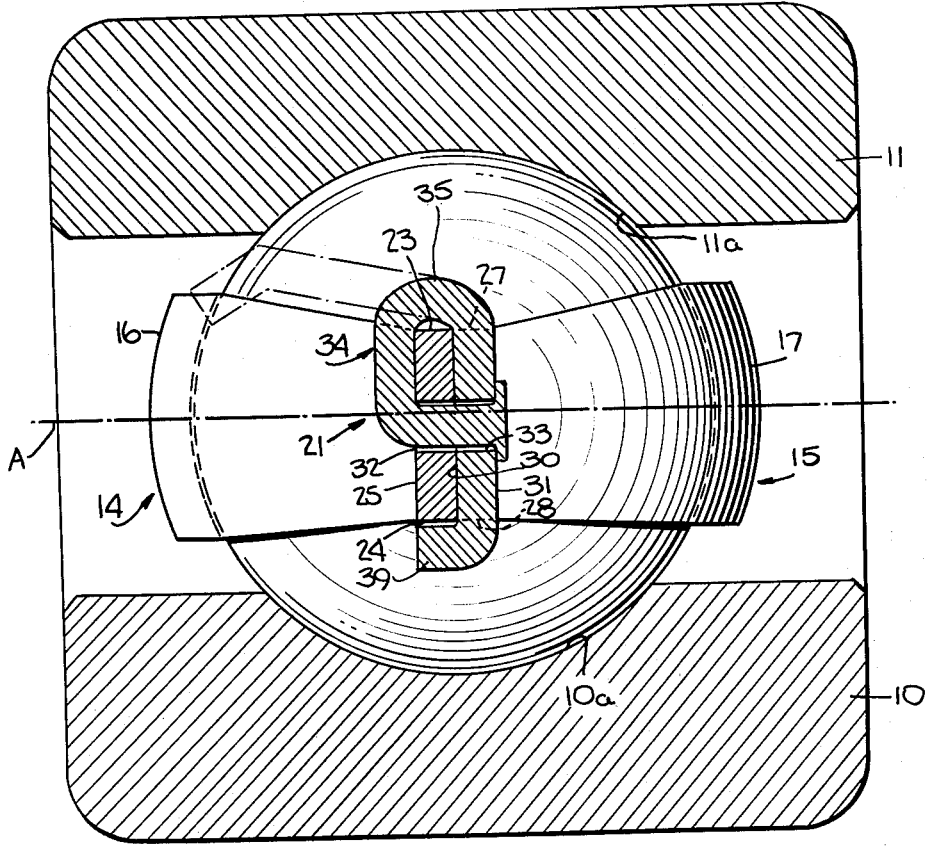
FIG. 2 is a sectional view taken along lines 2—2 of FIG. 1.
Figure 3:
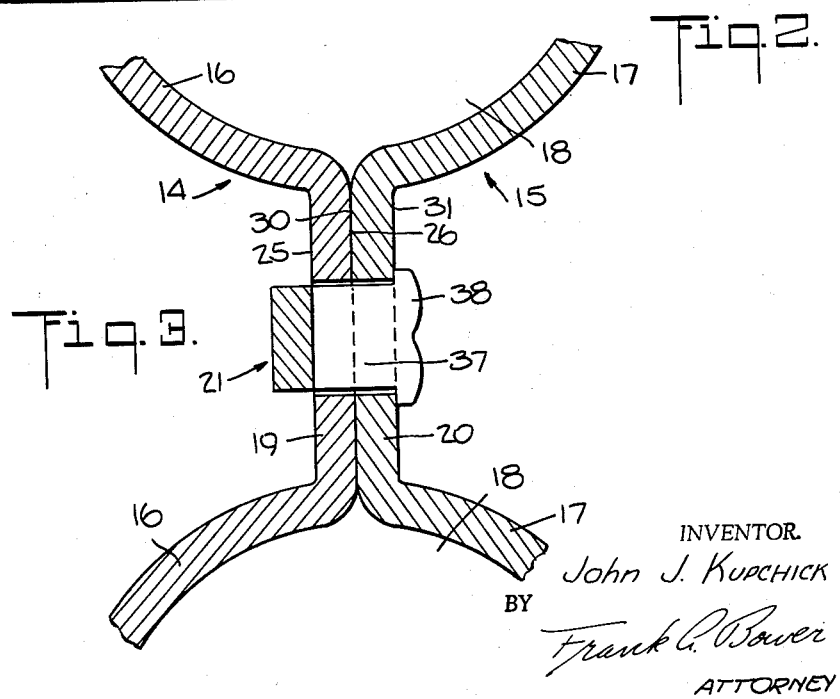
FIG. 3 is a sectional view of the cage taken along lines 3—3 of FIG. 1.

As illustrated in FIG. 2 the semicircular portions 16 and 17 are contoured to conform to the curvature of the bearing ball and extend above and below the line A about the same amount. Thus the cage supports or holds the balls separate from the inner and outer rings for the purpose of assembly of the bearing and after assembly to maintain the proper circumferential spacing of the bearing balls. The inner and outer rings 10 and 11 may be of the conventional type and have races 10a and 11a, respectively, for receiving the bearing balls.

The webs 19 are straight pieces having a generally rectangular cross section with an upper or outer edge or surface 23 and a lower or inner edge or surface 24 and side surfaces 25 and 26. The web 20 similarly has an upper or outer edge 27 and a lower or inner edge 28 and side surfaces 30 and 31. Each of the webs is provided with rectangular slots 32, 33 which are aligned as illustrated. The web 20 has a tab 34 extending from the upper edge or surface 27 and bent or curled over the upper edge 23 and along the surface 25 opposite to the engaging side surfaces 26 and 30 of the webs. A projection 37 of the tab 34 extends through the openings 32 and 33. The end of the projection 37 is peened or riveted over to form a head 38 engaging the side surface 31. The turned or curled portion 35 of the tab and the flange 39 extending from the lower edge 28 and bent at a right angle to the web 20 align the openings 32 and 33 and position the semicircular portions 16 and 17 in proper relation.

Figures 4, 5:
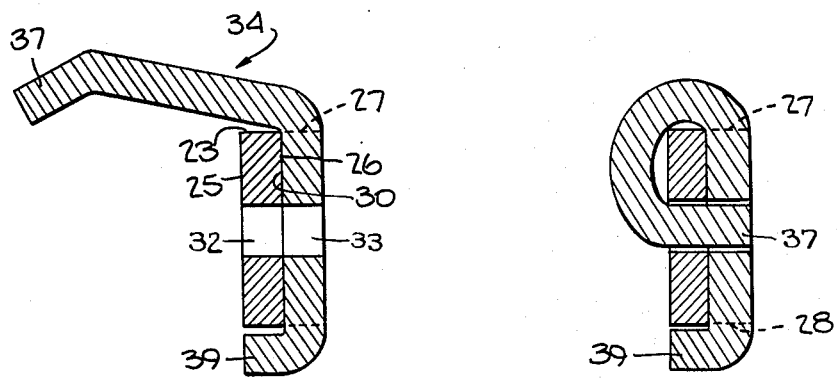
FIGS. 4 and 5 are sectional assembly views taken along lines 2—2 of FIG. 1 illustrating the formation of the fastening means.

As illustrated in FIGS. 4 and 5 the tab 34 is bent at approximately a right angle to the web 20 with the end of the tab slightly bent for fitting in the slots 32 and 33. The tab 34 is then turned or curled over with the projection 37 fitting in the openings 32 and 33. After the projection is forced through and the tab pressed against the surface 25, the head 38 is formed to securely lock the webs together. The flange 39 and curled portion 35 hold the webs 19 and 20 in proper relation during the curling and riveting action.

It is thus seen from the foregoing description that the fastening means provides a tab extending around the opposite side of the other web and then extending through the two webs to provide a positive locking by peening or riveting the projecting end extending through the two webs. The projecting end prevents circumferential shifting of the two parts and provides for the secure clamping of the webs in combination with the curled tab portion. The curled portion 35 and the flange 39 provide a radial lock between the two parts so that there is no radial separation occurring therebetween. Thus the fastening means provides a secure attachment of the two parts as well as preventing any circumferential or radial movement therebetween.

The invention is set forth in the appended claims.

I claim:

1. A ball bearing cage comprising a first and a second part, said first part having first contoured semicircular portions circumferentially spaced and having first webs extending therebetween and connecting said first semicircular portions, said second part having second contoured semicircular portions circumferentially spaced and having second webs extending therebetween and connecting said second semicircular portions, said first and second semicircular portions being matched to form bearing ball retaining means for receiving bearing balls and said first and second webs contacting one another and having aligned openings, said first webs having tabs extending over and around the respective second webs, said tabs having projecting ends extending through said aligned openings with peened heads securely forcing said contacting webs together to interlock said parts in bearing ball holding relation.

2. A ball bearing cage comprising a first and a second part cooperating to circumferentially space bearing balls and having first and second connecting means with said second means having a tab extending around said first means and extending through said first and second means, said tab having a deformed head locking said first and second means together with said first and second parts in bearing ball spacing relation.

3. A ball bearing cage comprising first and second circumferentially extending parts, said first part having first contoured circumferentially spaced portions and first web portions extending therebetween connecting said contoured portions, said second part having second contoured circumferetially spaced portions and second web portions extending therebetween connecting said second contoured portions, said first and second contoured portions being matched to form bearing ball holding means for receiving bearing balls, and said first and second web portions contacting one another and having openings in aligned relation, said first web portions have tabs extending over and around the respective second web portions and having projecting ends extending through said aligned openings, said tabs having peened heads engaging said first web portions to securely force said web portions together to interlock said first and second parts in bearing ball holding relation.

References Cited by the Examiner

UNITED STATES PATENTS

| | | | |
|---|---|---|---|
| 1,463,299 | 7/1923 | Staake | 308—201 |
| 1,480,998 | 1/1924 | Dlesk | 29—148.4 |

FOREIGN PATENTS

| | | |
|---|---|---|
| 406,725 | 2/1910 | France. |

DAVID J. WILLIAMOWSKY, *Primary Examiner.*

FRANK SUSKO, *Examiner.*